(12) United States Patent
Pascal et al.

(10) Patent No.: US 9,589,013 B2
(45) Date of Patent: *Mar. 7, 2017

(54) MESSAGE CONTENT MANAGEMENT SYSTEM

(71) Applicant: AT&T Mobility II LLC, Atlanta, GA (US)

(72) Inventors: Kristin Marie Pascal, Kirkland, WA (US); Andrew Evan Klonsky, Portland, OR (US); Matthew James Bailey, Seattle, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 622 days.

This patent is subject to a terminal disclaimer.

(21) Appl. No.: 14/032,979

(22) Filed: Sep. 20, 2013

(65) Prior Publication Data

US 2014/0025663 A1    Jan. 23, 2014

Related U.S. Application Data

(63) Continuation of application No. 12/342,953, filed on Dec. 23, 2008, now Pat. No. 8,566,403.

(51) Int. Cl.
*G06F 15/16* (2006.01)
*G06F 17/30* (2006.01)
(Continued)

(52) U.S. Cl.
CPC ...... *G06F 17/30424* (2013.01); *H04L 12/581* (2013.01); *H04L 12/583* (2013.01);
(Continued)

(58) Field of Classification Search
CPC .......... H04L 51/02; H04L 51/04; H04L 51/08
(Continued)

(56) References Cited

U.S. PATENT DOCUMENTS 5,880,731 A    3/1999  Liles
5,894,305 A    4/1999  Needham
(Continued)

FOREIGN PATENT DOCUMENTS

WO    2005067327 A1    7/2005

OTHER PUBLICATIONS http://www.openwave.com/us/news room/press releases/2002/20020319 OpWV mmsandsms 0319. htm. Retrieved 1 Feb. 20, 2009.

(Continued)

*Primary Examiner* — Jason Recek
(74) *Attorney, Agent, or Firm* — Amin, Turocy & Watson, LLP

(57) ABSTRACT

Multi-media content for inclusion into an SMS (Short Message Service), MMS (Multi-media Message Service), IM (Instant Message) or other message type can be searched, pre-searches, fetched and pre-fetched based upon predictive- and rules-based searching techniques. A system can predict or infer an in-process message, for example, based upon a portion of the inputted text message. Thereafter, in real- or near real-time, content related to the topic of conversation can be retrieved from a local store, remote stores (e.g., servers) or cloud-based sources. The retrieved content can be incorporated into the SMS, MMS, or IM message as appropriate or desired thereby enhancing the messaging experience.

20 Claims, 11 Drawing Sheets

(51) Int. Cl.
   *H04L 12/58* (2006.01)
   *H04W 4/12* (2009.01)
(52) U.S. Cl.
   CPC ............ *H04L 51/04* (2013.01); *H04L 51/063* (2013.01); *H04L 51/08* (2013.01); *H04W 4/12* (2013.01)
(58) Field of Classification Search
   USPC .............................. 709/206, 207; 455/412.1
   See application file for complete search history.

(56) References Cited

U.S. PATENT DOCUMENTS

| | | | |
|---|---|---|---|
| 6,177,931 | B1 | 1/2001 | Alexander |
| 6,434,604 | B1 | 8/2002 | Harada |
| 7,086,005 | B1 | 8/2006 | Matsuda |
| 7,124,164 | B1 | 10/2006 | Chemtob |
| 7,218,943 | B2 | 5/2007 | Klassen |
| 7,343,561 | B1 | 3/2008 | Stochosky et al. |
| 7,386,799 | B1 | 6/2008 | Clanton |
| 7,392,288 | B2 | 6/2008 | Ooi et al. |
| 7,421,690 | B2 | 9/2008 | Forstall |
| 8,825,770 | B1* | 9/2014 | Jablokov ........................ 704/235 |
| 2003/0228909 | A1 | 12/2003 | Tanaka |
| 2004/0260756 | A1 | 12/2004 | Forstall |
| 2005/0004985 | A1 | 1/2005 | Stochosky |
| 2005/0004995 | A1 | 1/2005 | Stochosky |
| 2005/0256929 | A1* | 11/2005 | Bartol .................. G06Q 10/107 709/206 |
| 2006/0003779 | A1 | 1/2006 | Lekutai |
| 2006/0069728 | A1* | 3/2006 | McEvilly ............ G06F 17/2264 709/206 |
| 2006/0168054 | A1 | 7/2006 | Burkhart et al. |
| 2006/0277271 | A1 | 12/2006 | Morse |
| 2007/0073517 | A1 | 3/2007 | Panje |
| 2007/0073690 | A1 | 3/2007 | Boal et al. |
| 2007/0136668 | A1 | 6/2007 | Chen et al. |
| 2007/0152979 | A1 | 7/2007 | Jobs |
| 2007/0156910 | A1 | 7/2007 | Christie |
| 2008/0034037 | A1 | 2/2008 | Ciudad |
| 2008/0034038 | A1 | 2/2008 | Ciudad |
| 2008/0034315 | A1 | 2/2008 | Langoulant |
| 2008/0055269 | A1 | 3/2008 | Lemay |
| 2008/0094368 | A1 | 4/2008 | Ording |
| 2008/0094369 | A1 | 4/2008 | Ganatra |
| 2008/0165148 | A1 | 7/2008 | Williamson |
| 2008/0235083 | A2* | 9/2008 | Bosarge .................. G06Q 30/02 705/14.73 |
| 2008/0256107 | A1* | 10/2008 | Banga .................... G06Q 10/00 |
| 2008/0313182 | A1 | 12/2008 | Vasa |
| 2009/0073888 | A1* | 3/2009 | Gollapudi ............. H04L 12/581 370/252 |
| 2009/0113315 | A1 | 4/2009 | Fisher et al. |
| 2009/0117922 | A1* | 5/2009 | Bell .................. H04M 1/72552 455/466 |
| 2009/0129278 | A1* | 5/2009 | Kumar .................. H04L 51/063 370/241 |
| 2009/0313341 | A1 | 12/2009 | Leinfellner et al. |
| 2010/0011021 | A1 | 1/2010 | Varadarajan et al. |
| 2010/0058200 | A1* | 3/2010 | Jablokov ................ G06Q 30/02 715/752 |
| 2010/0071013 | A1 | 3/2010 | Vandermolen et al. |
| 2010/0082757 | A1 | 4/2010 | King et al. |
| 2010/0114887 | A1 | 5/2010 | Conway et al. |
| 2010/0124913 | A1 | 5/2010 | Cox |
| 2010/0169441 | A1 | 7/2010 | Lafleur et al. |
| 2010/0198931 | A1 | 8/2010 | Pocklington et al. |
| 2010/0269138 | A1 | 10/2010 | Krikorian et al. |

OTHER PUBLICATIONS www.3jam.com. Retrieved Feb. 20, 2009.
http://mashable.com/2007/09/20/virgin-mobile-3jam/. Retrieved Feb. 20, 2009.
http://news.cnet.com/8301-13580_3-9768707-39.html. Retrieved Feb. 20, 2009.
http://ajaxpatterns.org/Predictive_Fetch. Retrieved Feb. 20, 2009.
http://help.yahoo.com/tutorials/cg/mail/cg_chatadv2.html. Retrieved Feb. 20, 2009.
http://www.talkshoe.com/se/abouUTSAbout.html. Retrieved Feb. 20, 2009.
http://en.wikipedia.org/wiki/Second_Life. Retrieved Feb. 20, 2009.
http://www.whyville.net/smmklnice. Retrieved Feb. 20, 2009.
http://www.there.com/whatisThere.html. Retrieved Feb. 20, 2009.
http://slfix.com/?p=658. Retrieved Feb. 20, 2009.
http://extratorrent.com/lorrentl905198fT ext+Message+to+TV+Screen+by+Fire Text.html. Retrieved Feb. 20, 2009.
http://mooseyard.com/Jens/2005/06/little-boxes-of-wordsl. Retrieved Feb. 20, 2009.
http://www.slashphone.com/xumii-launches-first-social-address-book-for-mobile-phones-at-demofall-08-212021, Retrieved Feb. 20, 2009.
http://www.xumii.com/ Retrieved Feb. 20, 2009.
http://www.apple.com/macosxlfeatures/ichat.html Retrieved Feb. 20, 2009.
http://www.apple.com/macosxlfeatures/300.html#ichat Retrieved Feb. 20, 2009.
http://www.flickr.com/photos/rmohns/1752400601/ Retrieved Feb. 20, 2009.
http://en.wikipedia.org/wiki/lchat Retrieved Feb. 20, 2009.
http://www. techcrunch.com/2007/08/15/most-useful-iphone-site-yet-meebol Retrieved Feb. 20, 2009.
http://www.appsafari.com/utilities/837/beejive-im/ Retrieved Feb. 20, 2009.
http://www.boygeniusreport.com/gallery/handsets/beejive-for-iphonel Retrieved Feb. 20, 2009.
http://www.boygeniusreport.com/gallery/handsets/beejive-for-iphonel?pid=3076#picture_nav Retrieved Feb. 20, 2009.
http://www.ilounge.com/index.php/articles/comments/iphone-gems-the-best-instant-messaging-apps Retrieved 11 Feb. 20, 2009.
http://www.iphonehacks.com/2007/08/iphone-mundu-im.html Retrieved Feb. 20, 2009.
http://www.iphonehacks.com/2007/07/iphone-trillian.html Retrieved Feb. 20, 2009.
http://www.group2call.com/ Retrieved Feb. 20, 2009.
http://www.appsafari.com/chat/1452/group2call Retrieved Feb. 20, 2009.
http://www.swaggle.mobi/sessions/new Retrieved Feb. 20, 2009.
http://twitter.com/ Retrieved Feb. 20, 2009.
http://www.sweetim.com/ Retrieved Feb. 20, 2009.
http://www.techcrunch. com/2006/09/27/a-look-at-eight -multi-person-sms-servicesl Retrieved Feb. 20, 2009.
http://www.labnol.org/internet/google-sms-subscribe-rss-via-sms/47261 Retrieved Feb. 20, 2009.
http://www.txtblaster.com/ Retrieved Feb. 20, 2009.
http://www.eztexting.com/ Retrieved Feb. 20, 2009.
http://in.content.mobile.yahoo.com/new/groups/tour3.html Retrieved Feb. 20, 2009.
http://www.sendgroupsms.com/ Retrieved Feb. 20, 2009.
http://www.jabber.org.au/ichat Retrieved Feb. 20, 2009.
http://www.mac.com/1/images/ichat_screenshot1_20051012.jpg Retrieved Feb. 20, 2009.
http://www.textually.org/textually/archives/2007/12/018249.htm Retrieved Feb. 20, 2009.
http://www.macupdate.com/info.php/id/24959 Retrieved Feb. 20, 2009.
http://news.cnet.com/8301-13579_3-9962739-37.html Retrieved Feb. 20, 2009.
http://modmyi.com/forums/new-skins-themes-launches/4610-sms-balloon-collection.html Retrieved Feb. 20, 2009.
http://farm2.static.flickr.com/1321/1352786329_808877273e_o.png Retrieved Feb. 20, 2009.
http://mooseyard.com/Jens/wp-contentluploads/2008/03/balloon-chat-ui-21-april-1997 .png Retrieved Feb. 20, 2009.

(56) References Cited

OTHER PUBLICATIONS http://www.dbug.org/publications/articles/ichat_1_review.shtml Retrieved Feb. 20, 2009.
http://iphone.cazisoft.coml?paged=11 Retrieved Feb. 20, 2009.
http://www.mysupergroups.com/tour Retrieved Feb. 20, 2009.
http://www.mysupergroups.com/faqs Retrieved Feb. 20, 2009.
http://www.cssplay.co.uklmenu/bubbles Retrieved Feb. 20, 2009.
Kurlander, et al. "Comic Chat" Proceeding SIGGRAPH '96, Proceedings of the 23rd annual conference on Computer graphics and interactive techniques, Aug. 1996, 12 pages.
Wikipedia. "Microsoft Comic Chat", retrieved from [http://en.wikipedia.org/wiki/Microsoft_Comic_Chat] on Mar. 11, 2015, 3 pages.
http://www.testiphone.com/. Retrieved on Feb. 20, 2009. Cumulative citation, no copy attached per 37 C.F.R.1.98 (c).
http://www.tatango.com/tatango/details. Retrieved on Feb. 20, 2009.
http://www.smsgupshup.com/help. Retrieved on Feb. 20, 2009.
http://www.intomobile.com/2007/12/07/change-your-iphones-sms-text-message-bubbles-to-a-malte-finish-iphone-malte.html. Retrieved on Feb. 20, 2009. Cumulative citation, no copy attached per 37 C.F.R. 1.98(c).
http://www.youtube.com/watch?v=VDnzgvRh6Xk. Retrieved on Feb. 20, 2009. Cumulative citation, no copy attached per 37 C.F.R. 1.98(c).
http://www.eztext.com/. Retrieved on Feb. 20, 2009. Cumulative citation, no copy attached per 37 C.F.R. 1.98(c).
http://www.faculty.idc.ac.il/ariklIMRet-All.mov. Retrieved on Feb. 20, 2009. Cumulative citation, no copy attached per 37 C.F.R. 1.98(c).
http://www.iminent.com/default.aspx. Retrieved on Feb. 20, 2009. Cumulative citation, no copy attached per 37 C.F.R. 1.98(c).
http://www.youtube.com/watch?v=rliqNvybcR4. Retrieved on Feb. 20, 2009. Cumulative citation, no copy attached per 37 C.F.R. 1.98(c).
Office Action dated Apr. 27, 2011 for U.S. Appl. No. 12/342,953, 38 pages.
Office Action dated Oct. 27, 2011 for U.S. Appl. No. 12/342,953, 21 pages.
Office Action dated Jun. 26, 2012 for U.S. Appl. No. 12/342,953, 21 pages.
Office Action dated Jan. 2, 2013 for U.S. Appl. No. 12/342,953, 22 pages.
Notice of Allowance dated Jun. 21, 2013 for U.S. Appl. No. 12/342,953, 30 pages.

* cited by examiner

MESSAGE CONTENT MANAGEMENT SYSTEM

CROSS-REFERENCE TO RELATED APPLICATION

This application is a continuation of U.S. patent application Ser. No. 12/342,953 (now U.S. Pat. No. 8,566,403, entitled "MESSAGE CONTENT MANAGEMENT SYSTEM" and filed on Dec. 23, 2008. The entirety of the above noted application is incorporated herein by reference.

BACKGROUND

The Internet continues to make available ever-increasing amounts of information which can be stored in databases and accessed therefrom. With the proliferation of portable terminals and wireless devices (e.g., smartphones, cellular telephones, personal data assistants (PDAs), and other similar communication devices), users are becoming more mobile, and hence, more reliant upon information accessible via the Internet.

In addition to using mobile terminals for standard voice communications and Internet access, more and more users are 'text messaging' to reach out and keep in touch with friends and family. Text messaging, also known as 'texting' is a term used for sending short text messages, usually from one mobile terminal to another. One popular communications protocol used for texting is SMS (Short Message Service). Today, SMS text messaging is probably the most widely used communication protocol.

Although SMS was originally designed for GSM (Global System for Mobile communications) standard for mobile phones, SMS is now available with non-GSM systems such as 3G ($3^{rd}$ Generation) networks. Similar to SMS, MMS or Multimedia Messaging Service is a standard for telephony messaging systems capable of transmission of multi-media content. More particularly, while SMS is used for text messaging, MMS is a cellular telephone standard for sending messages that include multimedia objects such as images, audio, video and rich text.

As technology advances, SMS and MMS messaging are available on most mobile phones and networks. However, devices have not integrated functionalities so as to take advantage of today's powerful mobile devices. For example, phones that have access to the Internet do not leverage this vast source of information. In other words, devices have not been designed to integrate content from the Internet into SMS and MMS messages.

DETAILED DESCRIPTION

Figure 1:
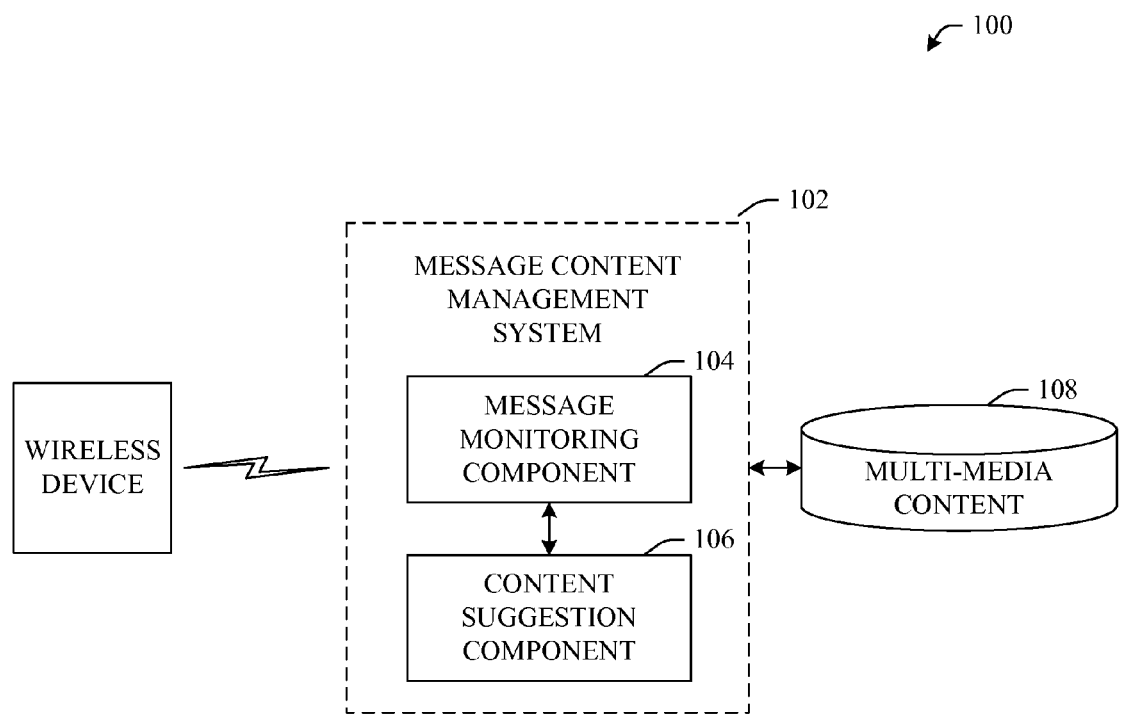
FIG. 1 illustrates an example block diagram of a system capable of fetch or pre-fetching content for inclusion in a communication such as an SMS or MMS message.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The innovation disclosed and claimed herein, in one aspect thereof, comprises a systems (and corresponding methodologies) capable of searching, pre-searching, fetching and pre-fetching multi-media content for inclusion into an SMS (Short Message Service), MMS (Multi-media Message Service), IM (Instant Message) or other message type based upon predictive- and rules-based searching techniques.

In aspects, the system can predict or infer an in-process message, for example, based upon a portion of the inputted text message. Thereafter, in real- or near real-time, content related to the topic of conversation can be retrieved from a local store, remote stores (e.g., servers) or cloud-based sources. The retrieved content can be incorporated into the SMS, MMS, or IM message as appropriate or desired.

In other aspects of the subject innovation, multi-media content can be searched and retrieved based upon messages received, messages sent as well as in-process messages. In other words, the innovation is capable of inferring desired multi-media content based upon parameters of an in-process message as well as message history. Still further, content can be suggested based upon other factors such as target recipient identity, frequency of communication to the target recipient, topic of communication, context of the parties or the like.

In yet another aspect thereof, machine learning and reasoning mechanisms are provided that employ a probabilistic and/or statistical-based analysis to prognose or infer an action that a user desires to be automatically performed.

Referring initially to the drawings, FIG. 1 illustrates a system 100 that enables incorporation of multi-media content into messages send by way of a mobile device, e.g., cell phone. As used herein, a "mobile device" is intended to include most any communication-capable portable device, including but not limited to a cell phone, smartphone, personal digital assistant (PDA), personal media player, laptop computer, global positioning system (GPS), game/entertainment console, etc. Additionally, while many of the aspects described herein are directed to mobile devices, it is to be understood that stationary devices, e.g., desktop computers, can employ the features, functions and benefits of the innovation described herein. Accordingly, these alternative aspects are to be included within the scope of the disclosure and claims appended hereto.

Generally, system 100 includes a message content management system 102 that facilitates comprehensive fetch and incorporation of multi-media content (e.g., image, video, audio, music, emoticon) into messages transmitted via a variety of protocols such as SMS (Short Message Service), MMS (Multi-media Message Service), IM (Instant Message) and electronic mail (email). As described herein, the innovation facilitates comprehensive message generation by suggesting or otherwise incorporating multi-media content into a message based on content of the text portion of a message and other criteria as described herein.

As shown, the message content management system 102 can include a message monitoring component 104 and a content suggestion component 106 that facilitate fetching multi-media content from a source 108. As described herein, the source 108 can be a local store (e.g., hard disk), remote store (e.g., server(s)), cloud-based source, or combination thereof. It is to be understood and appreciated that the message content management system 102 can be incorporated into a wireless device or otherwise deployed remotely. In operation, in one embodiment, content can be fetched based upon the "gist" of a message wherein the "gist" can include, but is not limited to, the substance, content, literal meaning, intended meaning, implied meaning, general idea, essence, content or the like.

The innovation enables searching, pre-searching, fetching, or pre-fetching multi-media content in an SMS/MMS/IM environment. In one example, as text is entered by the user, the message content management system 102 can predict or infer search text for inclusion into the message. Inclusion of multi-media content can be automatic, for instance, by way of a pre-determined rule or inference.

In aspects, the system 100 can access local, remote and cloud-based images, video, music, etc. as the user is inputting text for an SMS-type message on a mobile device. By way of example, as the user types in "Did you see the Pgh Steelers game last night?" the system would pre-search and/or pre-fetch images and video of the Pittsburgh Steelers game. Particularly, the specificity of the search can be such that the system 102 is capable of determining the date and thereafter capable of finding multi-media content that corresponds to the particular game in addition to, or in place of, content related to the Steelers generally.

Continuing with the example above, as the user enters ' . . . Pgh St", the system 102 can infer that the message was going to be directed to the "Pittsburgh Steelers" thereby automatically prompting content search. In addition to multi-media content, the innovation is also capable of locating and suggesting web-links or hyperlinks to websites relevant to the message. As multi-media content can be incorporated into a message, the links too can be attached to the message thereby increasing the comprehensiveness of the messaging experience.

As the details included in the message or messaging conversation increase, the specificity of the retrieval of content also increases. For example, if the conversation turns to a particular "touchdown reception by Hines Ward", the system can use keywords from the input to increase the granularity of the search. Here, "touchdown reception" and "Hines Ward" can be used to increase the granularity thereby returning content specific to the message. As described above, the system is capable of predicting text based upon a portion of the message or words within the message.

The message monitoring component 104 can employ prediction-, rules- and/or inference-engines to establish a query by which content can be retrieved. This content retrieval can be based upon in-process messages as described above. Additionally, as will be described infra, content retrieval can be based upon messages received, e.g., for inclusion into a reply to the message. The content suggestion component 106 can effect location of the content and subsequently render content to the user for inclusion into a message as desired or appropriate. Each of these sub-components (104, 106) will be described in greater detail below.

Figure 2:
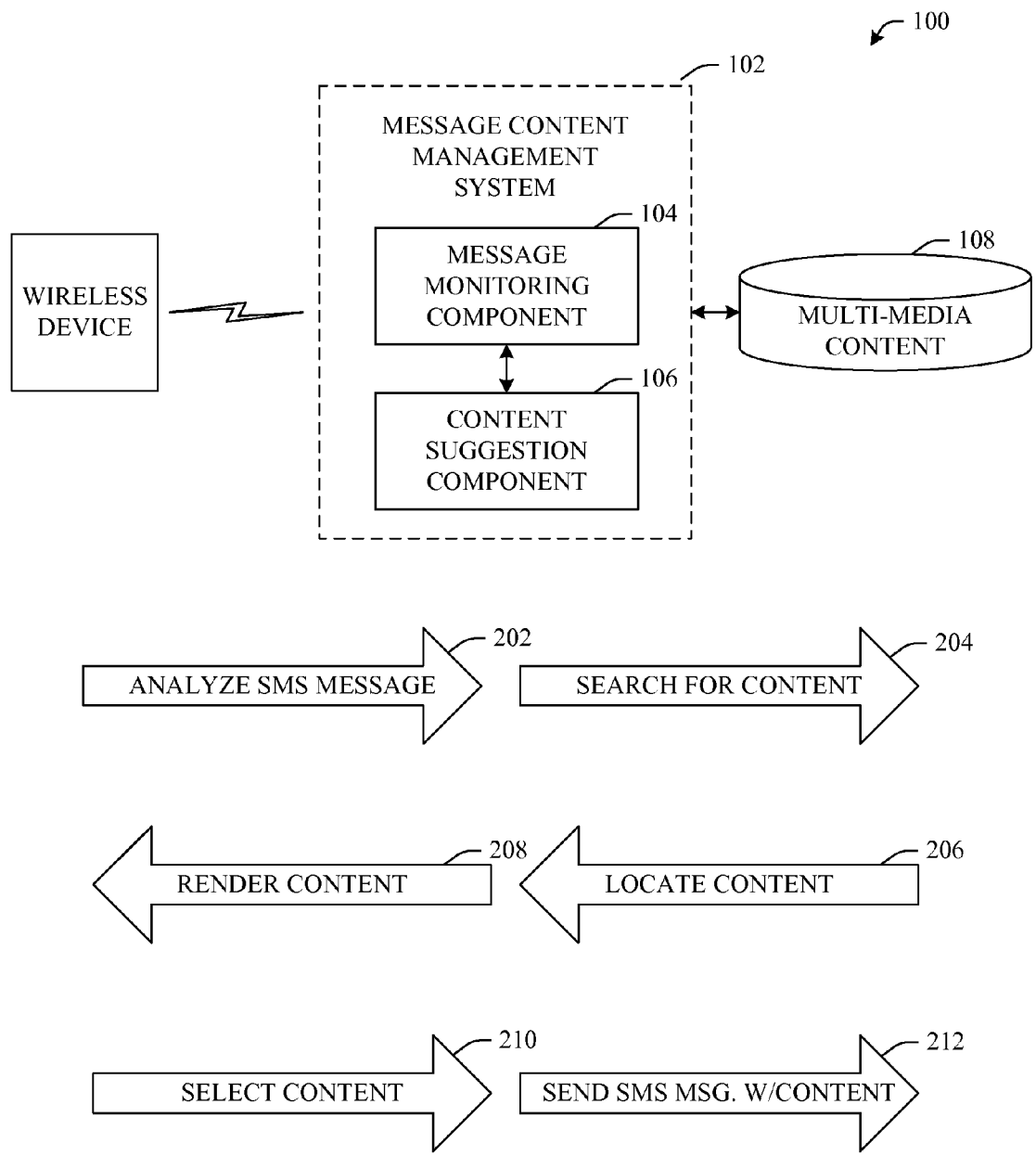
FIG. 2 illustrates an example flow chart of procedures that facilitate incorporating multi-media content into a message in accordance with an aspect of the innovation.

Referring now to FIG. 2, an example communication flow in accordance with the system 100 is shown. At 202, an SMS message can be analyzed. For example, an in-process SMS message can be analyzed in real- or near real-time. As a user types the message, the message can be analyzed whereby content can be inferred. As described above "Pgh Stee . . . " can be predicted or inferred to be "Pittsburgh Steelers." Similarly, received and previously sent messages can be analyzed. The result of this analysis can be used to further predict or infer content of the in-process message or reply to a received message. Additionally, the analysis can be dynamic in that it continues to evolve as input(s) is received. It will be understood that information captured or included in message conversations (e.g., received and sent messages) can enhance accuracy of predictions and inferences.

Additionally, rules-based logic can be employed to determine content for inclusion. For instance, a message to a co-worker might include different content than a similar (or the same) message to a fraternity brother. It is to be understood that most any rules-based logic parameters, policies and preferences can be employed to limit or enhance searching capability of the innovation.

Content such as multi-media content and hyperlinks can be searched at 204. Here, local, remote and cloud-based sources can be searched. Content located can be transmitted to and rendered by the wireless device at 206 and 208 respectively. As will be understood upon a review of the figures that follow, the rendering can be configured in most any manner as desired or appropriate. For instance, content can be ranked and/or filtered based upon most any policy, preference, regulation, etc.

At 210, content can be selected for inclusion in an SMS (or other protocol) message. Here, the user can employ most any navigation or selection mechanism to effect the selection of the desired content. Additionally, if desired, content can be selected automatically, for example, in accordance with a rule or inference. Finally, at 212, the SMS message can be sent with the content included (or linked thereto). As will be understood, the innovation can enhance messaging experiences by providing the ability to include multi-media content into messages.

Figure 3:
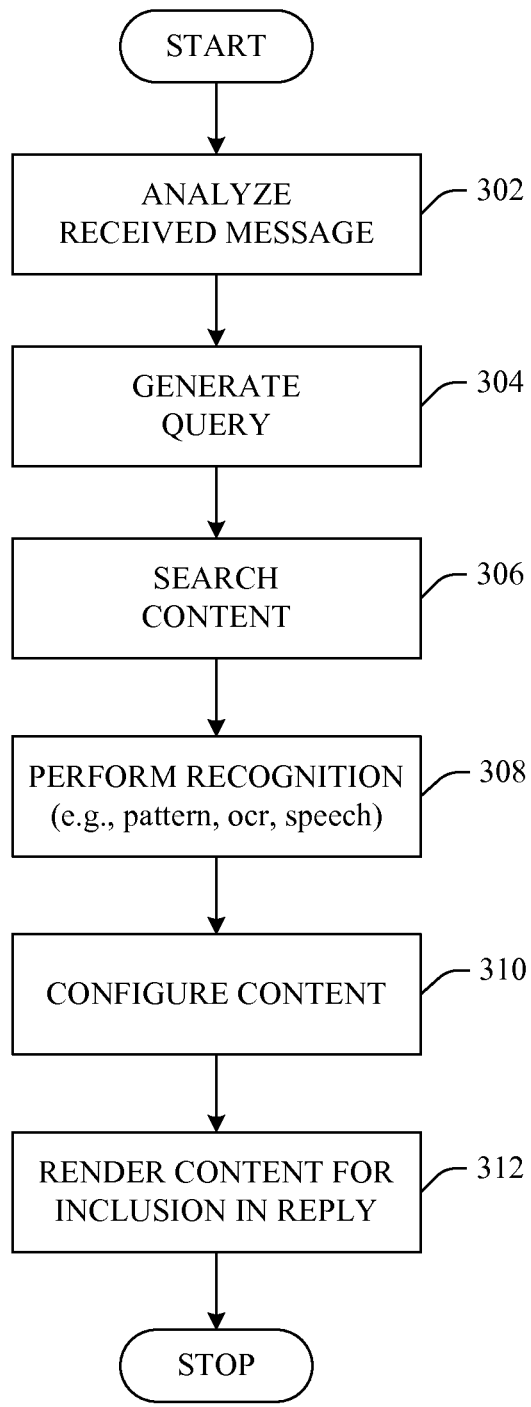
FIG. 3 illustrates an example flow chart of procedures that facilitate fetching content in accordance with a received message.

FIG. 3 illustrates a methodology of suggesting multimedia content for a reply to a received message in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302, a received message can be analyzed. For example, a received SMS, MMS, IM or email message can be analyzed. This analysis can establish the topic or subject of the message. Additionally, the sender's identity, relationship, tone, context (e.g., location, activity), etc. can be established. At 304, the result of this analysis can be employed to generate a query (or information request) for content.

Content can be searched at 306. Here, content including, but not limited to, multi-media content (e.g., images, video, audio), hyperlinks, emoticons, etc. can be searched based upon the parameters defined by the analysis. As described supra, the search can be effected upon sources that are local, remote and/or cloud-based. In accordance with the search or thereafter, content recognition can optionally be performed upon located content at 308.

This recognition can include pattern recognition for images or video, optical character recognition (OCR) for text-based content, speech recognition etc. In operation, the recognition can be used to find relevant or appropriate content as well as to effectively configure the content at 310. In other aspects, tags or other data identifiers can be used to facilitate configuration. For instance, content can be ranked or filtered as desired or appropriate, e.g., based upon a rule, preference or policy. Finally, at 312, content can be rendered to a user for selection and subsequent inclusion into a reply to the received message. In alternative aspects, content can be automatically selected on behalf of a user. Here, rules and/or inferences can be employed to effect the selection (and inclusion) of content.

Figure 4:
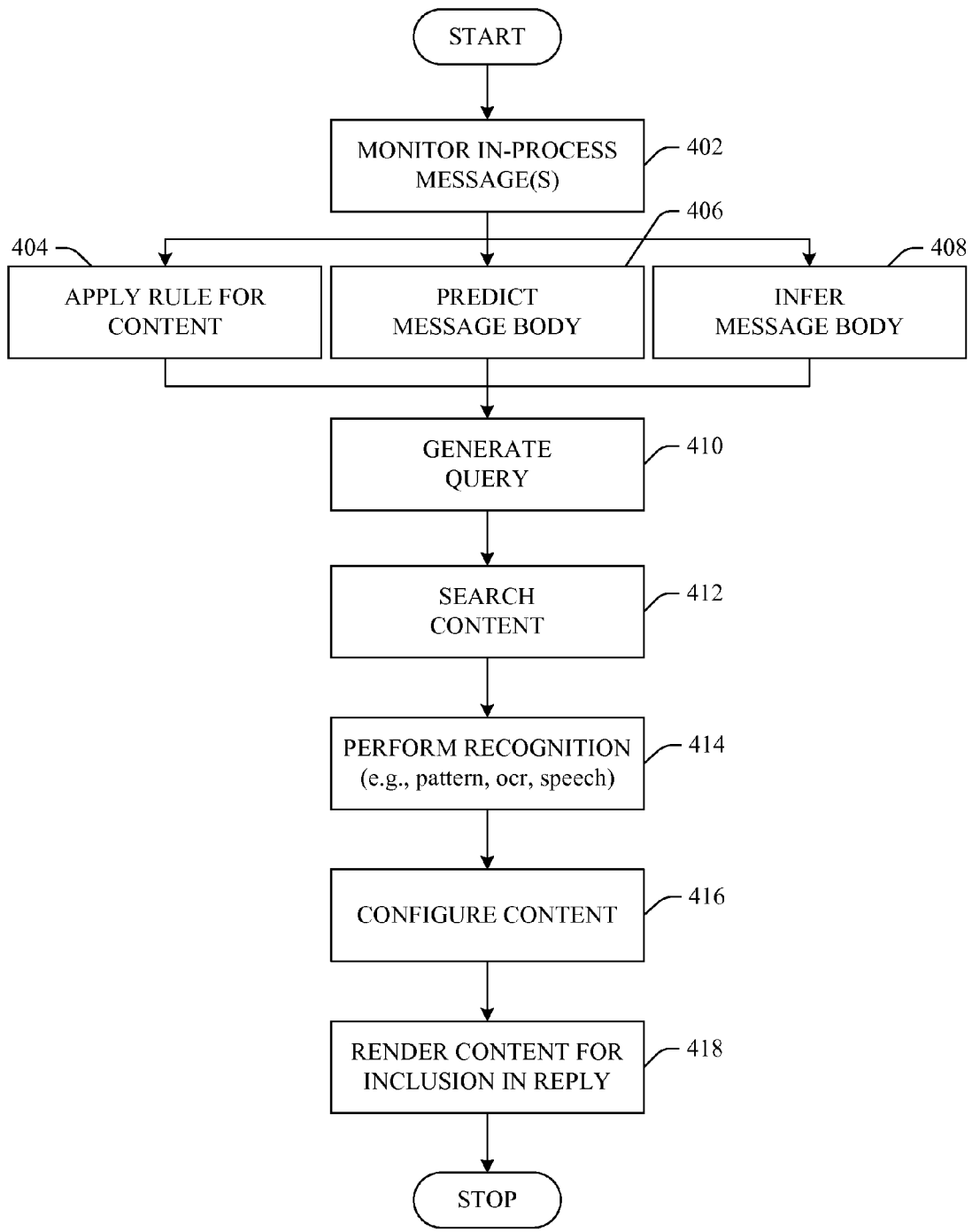
FIG. 4 illustrates an example flow chart of procedures that facilitate fetching content in accordance with an in-process message.

Referring now to FIG. 4, there is illustrated a methodology of fetching content for inclusion into an in-process message in accordance with the innovation. At 402, user's messaging activity can be monitored in a real- or near real-time manner. Effectively, as a user types a message (e.g., SMS, MMS, IM, email . . . ) the innovation monitors the generation of the message.

Parameters of the message can be established at 404, 406 and 408 respectively. For instance, keywords can be established from the actual message content. Additionally, keywords can be established which are related to the actual content. Continuing with the aforementioned example, while the message includes "Pgh Steelers", an association to other keywords such as "football," "sports" or the like can be established. Prior to doing so, the content of the message is established at 404, 406 and/or 408.

At 406, rules-based logic can be applied to establish content of the in-process message. For instance, a user can pre-define a rule that relates "Pgh Steelers" to "sports" and "football" when discovered. As well, rules can be as granular as desired. In other words, if the message is being sent to a particular friend from/in Pittsburgh, "Pgh Steelers" might relate to the "Pittsburgh Steelers." Similarly, if the message is being sent to co-worker, "Pgh Steelers" might relate to "football" or "sports" generally.

In other aspects, the message body can be predicted at 406. For example, auto-fill techniques can be used to complete or suggest completion of a message body. This prediction can be used to establish keywords of the message itself. Still further, sophisticated logic such as machine learning and reasoning (MLR) logic can be employed at 408 to infer the message body. As described below, historical, statistical, etc. mechanisms can be employed to infer the specifics of the message body.

At 410, a query can be generated, for example a keyword search query. In accordance with the aforementioned example, keywords might be "Pittsburgh," "Steelers," "football," "sports," etc. In furtherance to the acts previously described, these keywords can be predicted, inferred or otherwise extracted from a text input as appropriate. Content such as multi-media content can be searched at 412. For instance, local, remote and cloud-based sources can be searched for relevant or otherwise associated content.

As described with reference to FIG. 3, a variety of recognition mechanisms can optionally be employed at 414 to locate and otherwise configure content, for example at act 416. Continuing with the previously described example, depending on the granularity of the message and desired content inclusion, the innovation can employ recognition mechanisms to discover details in content, for example, to determine subjects of an image.

More specifically, by way of example, suppose the message is "Did you see the touchdown reception by Hines Ward in the Steelers' game last night?" Here, while images, video and other content that include the Pittsburgh Steelers, Hines Ward, football and sports, the recognition mechanisms can establish which, if any, of the content relates to the touchdown reception by this particular player from a particular team in a particular game.

Results of this recognition, although optional, can be employed to configure the content at 416 for rendering at 418. In other words, content can be ranked based upon relevance or other desired criteria. Additionally, the results of the recognition can be employed to filter or otherwise organize content to enhance messaging experiences.

Figure 5:
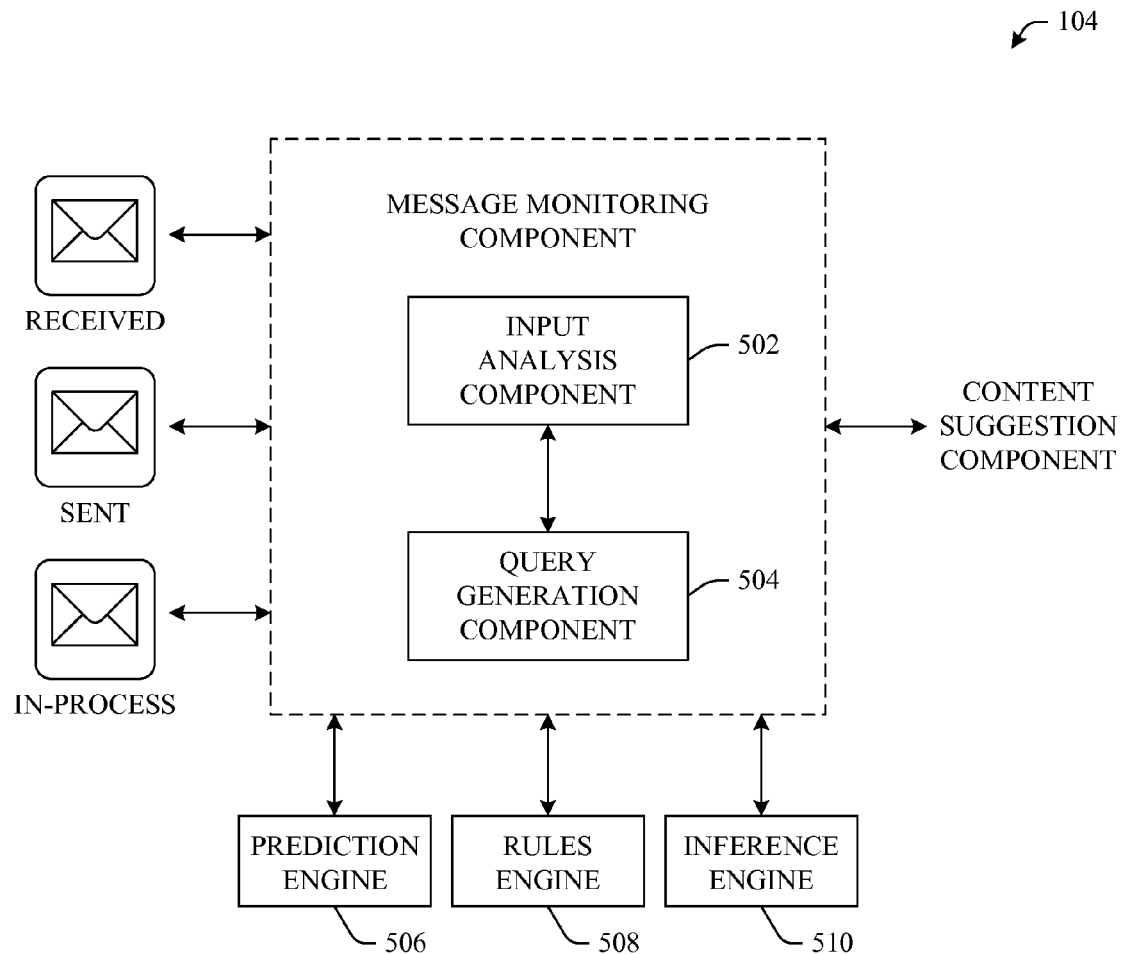
FIG. 5 illustrates an example message monitoring component in accordance with an aspect of the innovation.

Referring now to FIG. 5, an example block diagram of a message monitoring component 104 is shown. Generally, the component 104 can include an input analysis component 502 and a query generation component 504. Together, these sub-components (502, 504) are capable of evaluating an input and establishing query parameters by which content can be located for inclusion within (or association to) messages (e.g., SMS, MMS, IM, email).

The input analysis component 502 can evaluate an input to facilitate identification of keywords or other search parameters. In aspects, a prediction engine 506, rules engine 508 or inference engine 510 can be employed to effect the evaluation. Here, these engines (506, 508, 510) can be utilized to fill, auto-fill, forecast, assume or otherwise establish textual input, for example, from a portion of a sentence or word. With reference again to the aforementioned example, the input analysis engine 502, together with one or more of the engines (506, 508, 510) can conclude "Pittsburgh Steelers" from "Pgh Ste" or some other variation thereof.

As illustrated in FIG. 5, the input can be a textual input associated with a received message, sent message or in-process message. In these embodiments, information can be gathered from the input by which the query generation component 504 can establish query criteria and parameters that are effectively used to fetch (or pre-fetch) content for inclusion in a message.

The query generation component 504 processes the analysis results to establish a query or other request for information. As described in detail herein, the query can be based upon content of received, sent or in-process messages. Essentially, it will be understood that, by basing the query for information upon received, sent or in-process messages, a user's messaging experience can be enhanced by incorporating associated, related, or otherwise selected content.

An example of each input scenario follows. It is to be understood and appreciated that these examples are provided to add context and perspective to the innovation. As such, the example scenarios are not intended to limit the scope of this disclosure and claims appended hereto.

With reference first to consideration of a received message, here, the input analysis component 502 can extract keywords from or otherwise tokenize the textual content of the received message. These extracted portions can be used by the query generation component 504 to generate a request for information or other content, for example, multi-media content. This information and/or multi-media content can be used in a reply (or other action such as a forward of the message) to the received message.

In addition to the content of the received message, other factors that can be considered by the analysis component 502 include, but are not limited to, sender's identity, relationship to a user, age, occupation, race, religion, gender or the like. Still other factors that can be considered in providing information to the query generation component 504 include contextual factors such as, but not limited to, location, date, time of day, activity, etc. of both (or either) the sender and the user. These factors and parameters can be used to enhance the comprehensiveness of search for multi-media content and other content that can be included within a reply or other message (e.g., forward message) related to the received message.

Sent messages can also be analyzed to assist in locating or suggesting content for inclusion in messages or communications. It will be appreciated that inclusion of this content, e.g., multi-media content and hyperlinks, can enhance or otherwise supplement a communication experience. Similar to the analysis of received message, party identities, relationships, demographics, context, etc. can be used to intelligently fetch or pre-fetch content for inclusion in subsequent communications.

In addition to characteristics and factors related to the parties to the communication, content of related messages within a conversation can be used to establish additional content for location and subsequent inclusion. Additionally, sent messages that are not a part of a particular conversation but, that were sent to or between the same parties can also be considered in establishing content for location and inclusion. In operation, content in previous messages can be established in the same or similar manners as those described with reference to received messages above.

Turning now to a discussion of in-process messages, here, as described above, content can be analyzed to assist in location of multi-media or other content. This analysis can be the same or similar to that of received and sent messages described above. Additionally, content of in-process messages can be predicted or inferred as it is being entered. For example, as described above, as a user types "Pgh Stee", the system can predict or otherwise infer that the message is about the "Pittsburgh Steelers." Thereafter, content related to this topic can be located using a query generated by the query generation component 504.

In aspects and with continued reference to FIG. 5, the query component 504 can employ a rules engine 508 which utilizes an implementation scheme (e.g., rule) to define and/or implement a query. It will be appreciated that the rule-based implementation can automatically and/or dynamically define and implement a query of a data source. In response thereto, the rule-based implementation can select content based upon most any desired criteria (e.g., file type, file size, hardware characteristics, preferences).

By way of example, a user can establish a rule that can implement a query of a preferred type of file (e.g., image, video, music). In this exemplary aspect, the rule can be constructed to select all files of a particular type that correspond to an input and are located in a targeted data store or source location(s). Accordingly, as described with reference to FIG. 6 that follows, a result set of content can be obtained, included, suggested, etc. as desired.

The inference engine component 510 can employ machine learning and reasoning which facilitates automating one or more features in accordance with the subject innovation. The subject innovation (e.g., in connection with content selection or message completion) can employ various MLR-based schemes for carrying out various aspects thereof. For example, a process for determining how to predict or auto-complete a message, what content to search for, how to construct a query, what content to automatically incorporate into a message, etc. can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to auto-complete a message, how to construct a query, what content to locate, when to automatically incorporate content into a message, etc. While these engines 506, 508, 510 are illustrated in connection with the message monitoring component 104, it is to be understood that the content suggestion component 106 can similarly include or employ these logic components to enhance functionality, for example, by inferring actions on behalf of a user.

Figure 6:
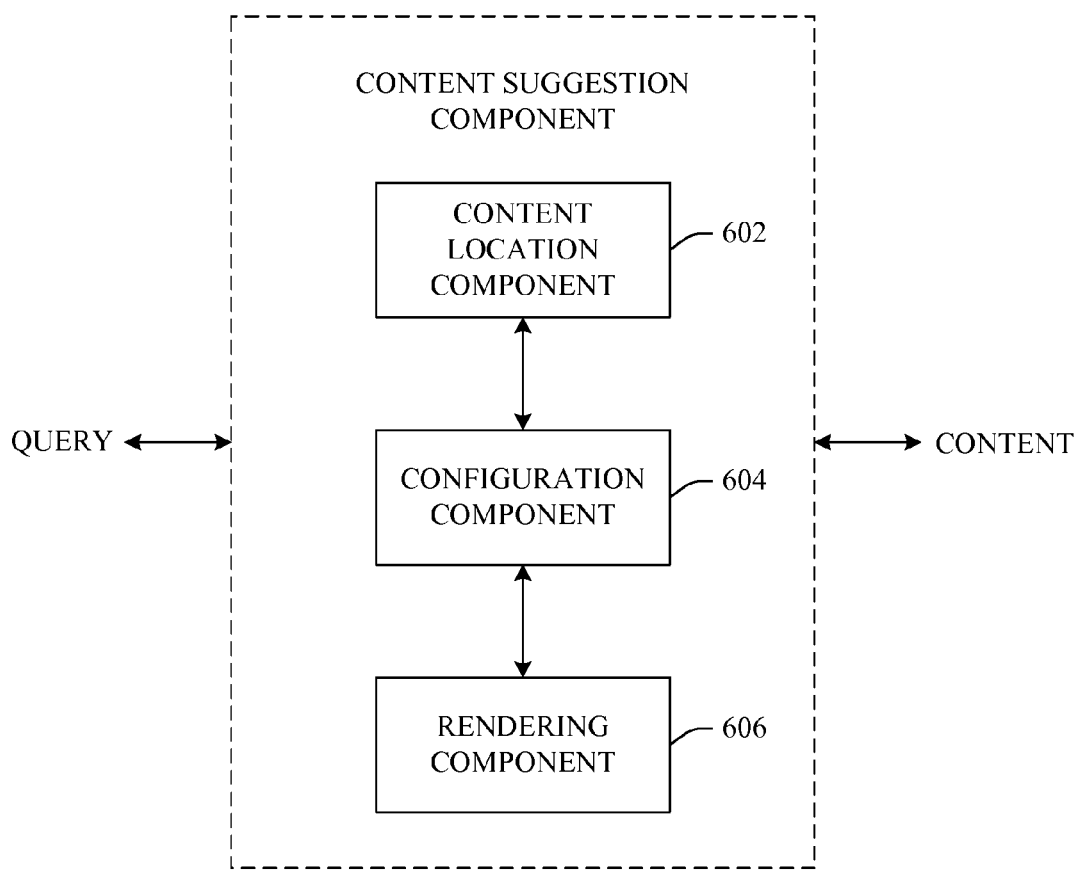
FIG. 6 illustrates an example content suggestion component in accordance with an aspect of the innovation.

FIG. 6 illustrates a block diagram of an example content suggestion component 106 in accordance with an aspect of the innovation. As shown, the component 106 can include a content location component 602 that effectively locates content such as multi-media content from a variety of sources such as local stores, remote sources (e.g., servers) as well as cloud-based sources. As illustrated, the content location component 602 can evaluate a query which is based upon messages received, sent or in-process, as described in detail supra.

The content suggestion component 106 can further include a configuration component 604 that is capable of evaluating located content and thereafter preparing the content for display or presentation to a user by a rendering component 606. Here, the configuration component 604 can order, rank, filter, etc. the content based upon most any criteria. In operation, rules, policies, preferences or inferences can be used to effect configuration of the content.

Figure 7:
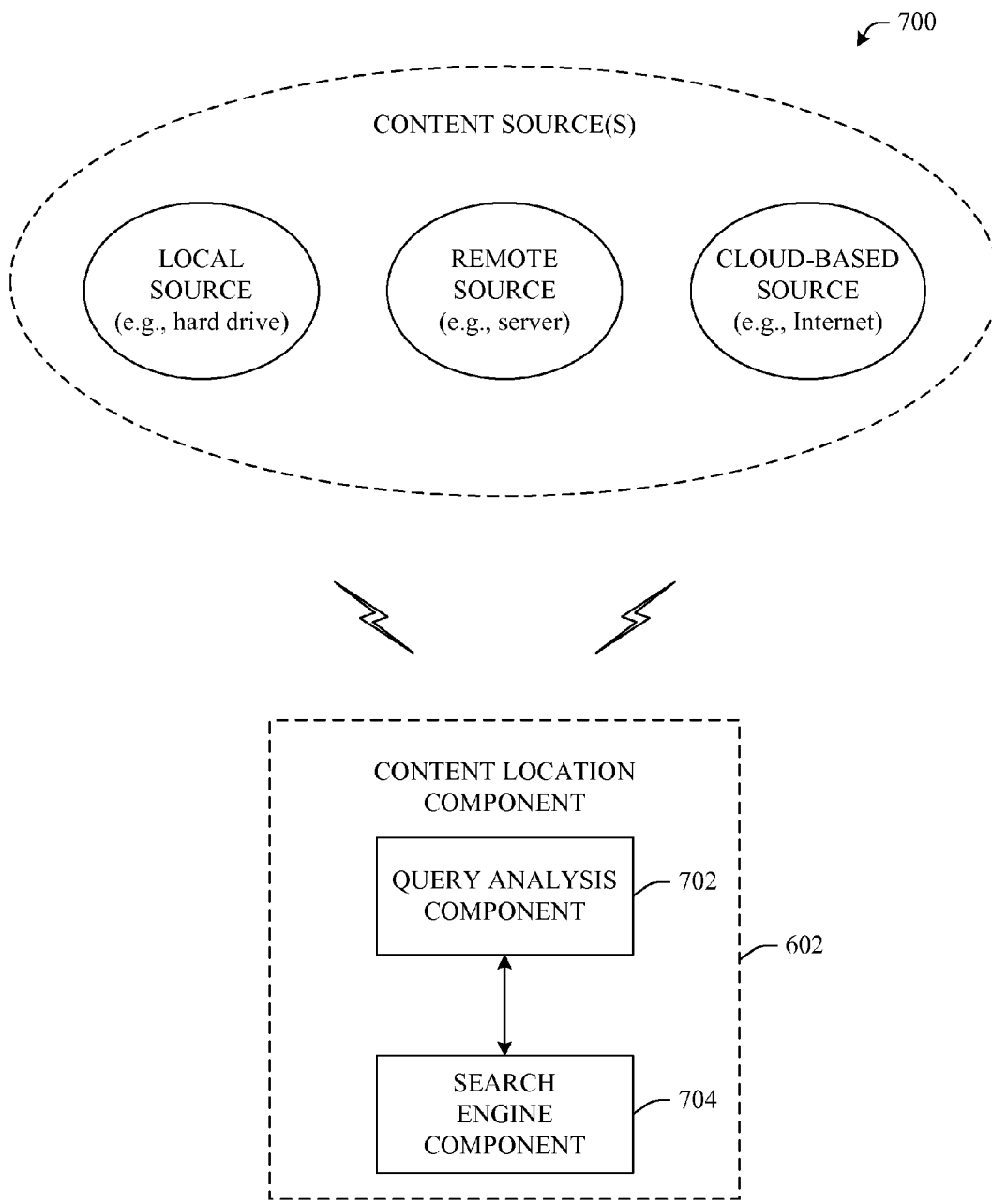
FIG. 7 illustrates an example content location component in accordance with an aspect of the innovation.

FIG. 7 illustrates an example system 700 that illustrates an example block diagram of a content location component 602. As shown, the component 602 can include a query analysis component 702 and a search engine 704. Essentially, these sub-components (702, 704) facilitate process of the query and location of relevant results respectively. Accordingly, multi-media content can be accessed or obtained from a local source, remote source or other cloud-based source.

Figure 8:
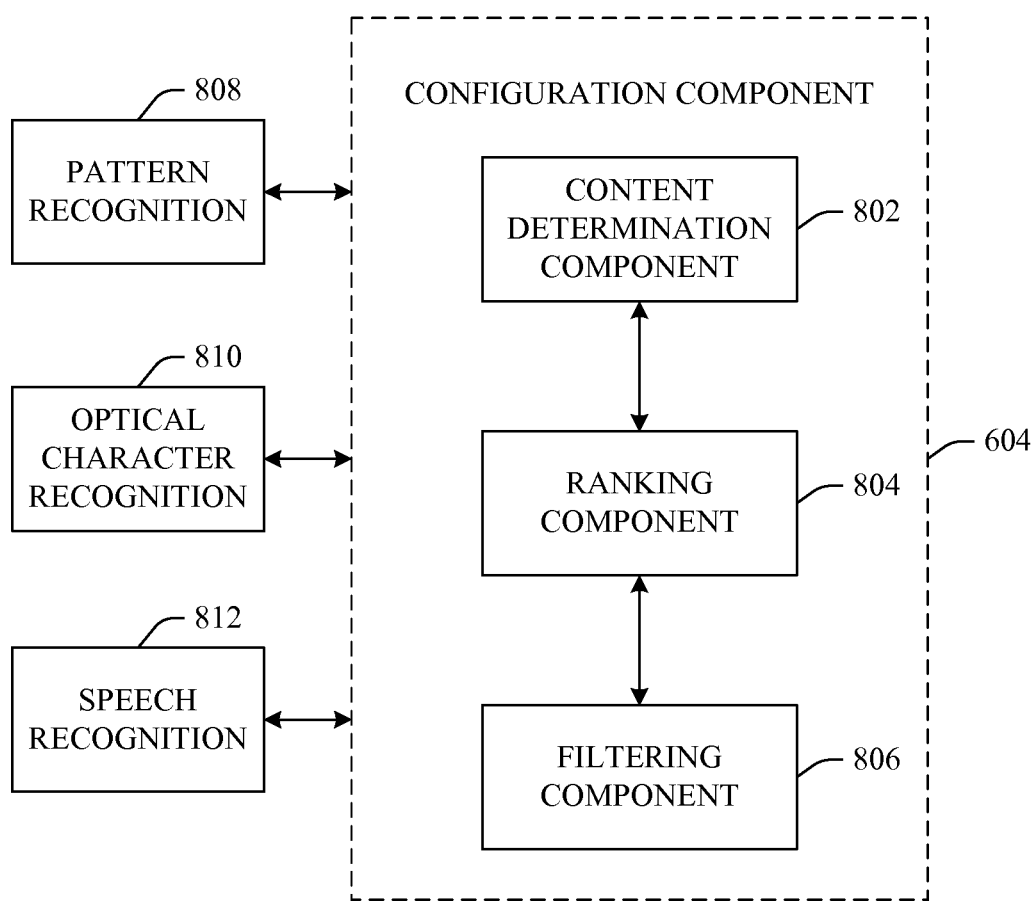
FIG. 8 illustrates an example configuration component in accordance with an aspect of the innovation.

Turning now to FIG. 8, an example block diagram of a configuration component 604 is shown. As illustrated, the example configuration component 604 can include a content determination component 802, a ranking component 804 and a filtering component 806. In determining content, for example, information and results returned by the content location component 602 can be evaluated by pattern recognition 808, optical character recognition 810, speech recognition 812, or the like. The results can be employed to establish relevance or other association metric by which the ranking component 804 and/or the filtering component 806 can use to arrange or filter prior to rendering to a user. Additionally, it is to be understood that, in aspects, the results of the ranking can be used to automatically determine or infer whether or not to include the particular content into a message, for example, an SMS/MMS/IM/email message.

Figure 9:
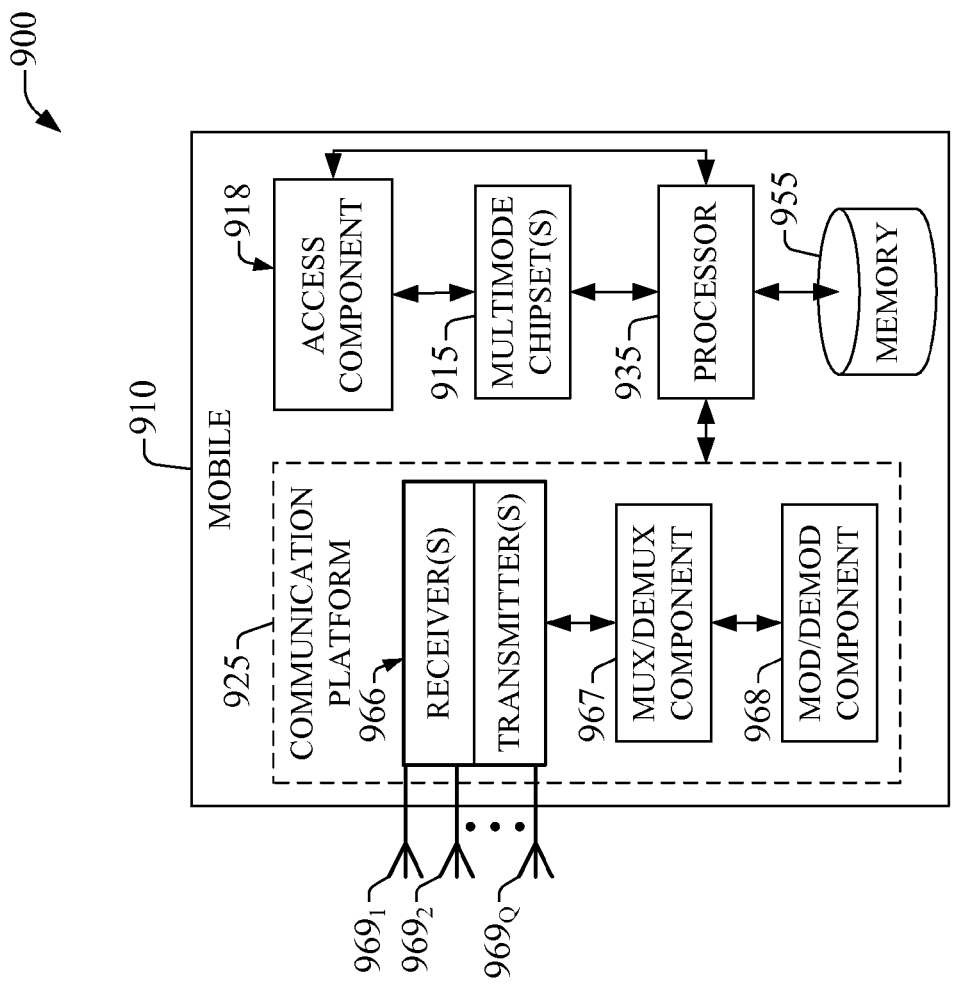
FIG. 9 is a schematic block diagram illustrating a suitable mobile operating environment for aspects of the subject disclosure.
Figure 10:
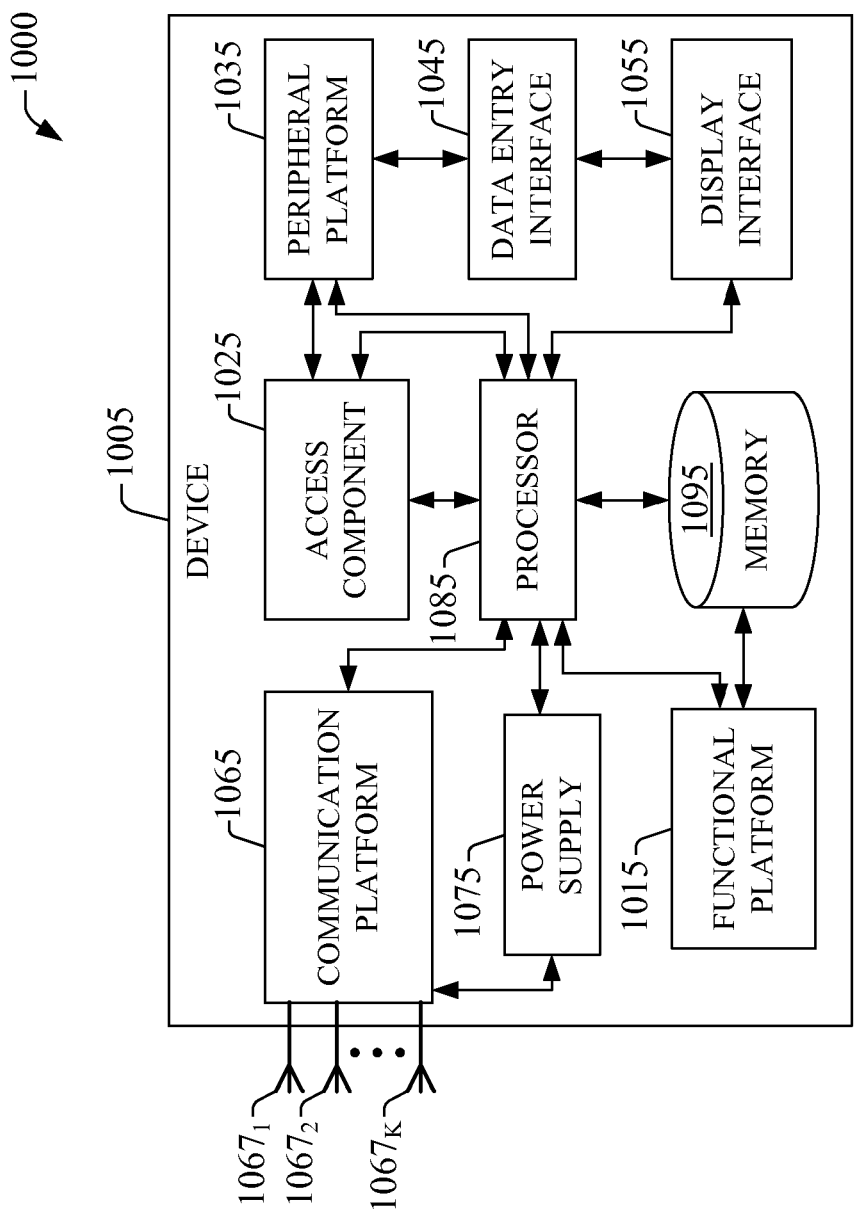
FIG. 10 is a schematic block diagram illustrating a suitable non-mobile operating environment for aspects of the subject disclosure.
Figure 11:
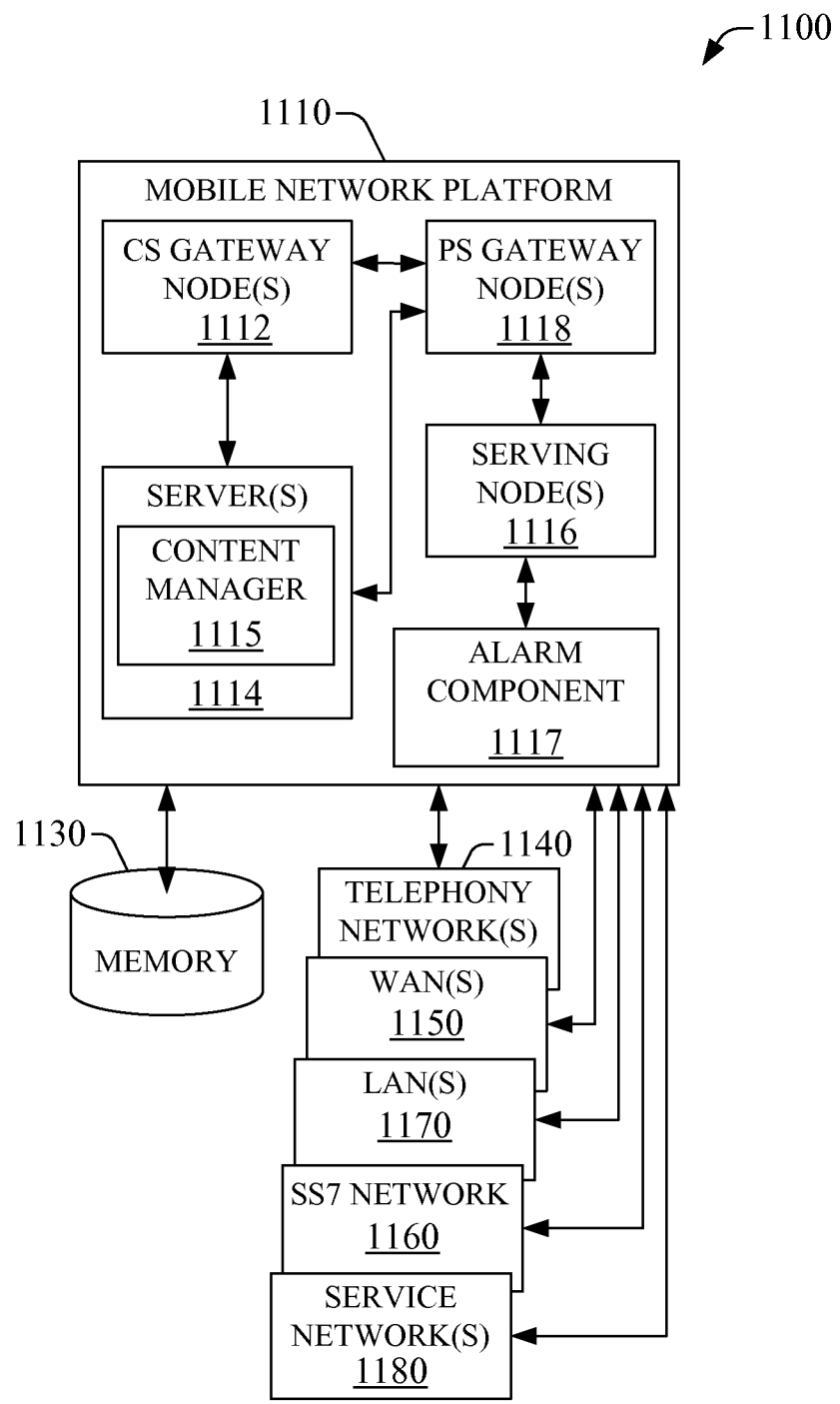
FIG. 11 is a schematic block diagram of a sample mobile network platform for aspects of the disclosed subject matter.

In order to provide a context for the various aspects of the disclosed subject matter, FIGS. 9-11 as well as the following discussion are intended to provide a brief, general description of suitable environments in which the various aspects of the disclosed subject matter can be implemented. FIG. 9 illustrates a block diagram of an example embodiment of a mobile device 910 that can be employed with respect to message content management in accordance with aspects described herein. FIG. 10 presents a block diagram of an example embodiment of a non-mobile device 1005, which can be provisioned through a non-mobile network platform and employed in accordance with aspects described herein. Further, FIG. 11 presents an exemplary embodiment of a mobile network platform 1110 that can provide content management service in accordance with aspects described herein.

Mobile device 910, which can be a multimode access terminal, includes a set of antennas $969_1$-$969_Q$ (Q is a positive integer) that can receive and transmit signal(s) to and from wireless devices like access points, access terminals, wireless ports and routers, and so forth, which operate in a radio access network. It should be appreciated that antennas $969_1$-$969_Q$ are a part of communication platform 925, which comprises electronic components and associated circuitry that provide for processing and manipulation of received signal(s) and signal(s) to be transmitted such as receivers and transmitters 966, mux/demux component 967, and mod/demod component 968.

Multimode operation chipset(s) 915 allows mobile device 910 to operate in multiple communication modes in accordance with disparate technical specification for wireless technologies. In accordance with one aspect, multimode operation chipset(s) 915 utilize communication platform 925 in accordance with a specific mode of operation (e.g., voice, Global Positioning System (GPS)). In another aspect, multimode operation chipset(s) 915 can be scheduled to operate concurrently (e.g., when Q>1) in various modes or within a multitask paradigm.

Mobile device 910 includes access component 918 that can convey content(s) or signaling in accordance with disclosed aspects. It should be appreciated that access component 918, can include a display interface that renders content in accordance with aspects of an interface component (not shown) that resides within access component 918.

Mobile device 910 also includes a processor 935 configured to confer functionality, at least in part, to substantially any electronic component within mobile device 910, in accordance with aspects of the disclosure. As an example, processor 935 can be configured to execute, at least in part, instructions in multimode operation chipset(s) that afford multimode communication through mobile device 910 such as concurrent or multi-task operation of two or more chipset(s). As another example, processor 935 can aid mobile device 910 in receiving and conveying signaling and content(s) (e.g., various data flows) that are part of an active management act initiated by a subscriber that operates mobile 910, or an approval cycle associated with auxiliary subscribers (e.g., secondary subscriber, tertiary subscriber . . . ). Moreover, processor 935 enables mobile device 910 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 955 can store data structures (e.g., metadata); code structure(s) (e.g., modules, objects, classes, procedures . . . ) or instructions; network or device information like policies and specifications, attachment protocols; code sequences for scrambling, spreading and pilot (e.g., reference signal(s)) transmission; frequency offsets, cell IDs, and so on.

The processor 935 is functionally and/or communicatively coupled (e.g., through a memory bus) to memory 955 in order to store and retrieve information necessary to operate and/or confer functionality, at least in part, to communication platform 925, multimode operation chipset(s) 915, access component 918, and substantially any other operational aspects of multimode mobile 2010.

FIG. 10 is a block diagram of an exemplary embodiment of a non-mobile device 1005 that can convey content(s) and exploit various aspects of content transaction(s), among other things. Device 1005 includes a functional platform 1015 that comprises a set of components (not shown) that provide, at least in part, one or more specific functionalities of the non-mobile device 1005. Additionally, non-mobile device 1005 includes an access component 1025 that operates in accordance with aspects previously described (e.g., 918 of FIG. 9). Moreover, in one aspect, non-mobile device 1005 can include a communication platform 1065 that can provide wireless communication capabilities in addition, or alternatively, to connectivity of non-mobile device 1005 through wired links (e.g., Ethernet, USB, GPIB, RS-232, FireWire, optical or coaxial cable connection to a network interface such as network interface, or router (not shown)). With respect to wireless capability, in non-mobile device 1005, which can be a multimode access terminal, a set of antennas $1067_1$-$1067_P$ (P is a positive integer) can receive and transmit signal(s) to and from wireless devices like access points, access terminals, wireless ports and routers, etc., that operate in a radio access network. Communication platform 1065 can exploit the set of "P" antennas $1967_1$-$1067_K$, (K is a positive integer) to establish communication within various modes such as single-input single-output, or multiple-input multiple output. Furthermore, communication platform 1065 can comprise various electronic components and associated circuitry that enable processing and manipulation of received signal(s) and signal(s) to be transmitted. In accordance with one aspect, the communication platform 1065 can be embodied in a modem.

Non-mobile device 1005 also includes a peripheral platform component 1035 that can include, or facilitate connection to, additional devices such as printer(s), media player(s), wireless router(s) (e.g., network interface), biometrics touch-pad(s), etc. According to one aspect, to afford such connectivity, peripheral component 1035 can include jacks for one or more of Ethernet, USB, GPIB, RS-232, FireWire, optical or coaxial cable connectors.

Display interface 1055 can enable rendering of content. In an aspect, display interface 1055 can be a liquid crystal display (LCD), a plasma panel, a monolithic thin-film based electrochromic display, amongst others. Additionally, display interface 1055 can be a part of functional platform 1015 (e.g., when non-mobile device 1005 is a PC, an IPTV interface, a mobile device, a back projector component, a data projector . . . ).

It should be appreciated that non-mobile device 1005 also can include a data entry interface 1045 that can allow an end user to (i) command non-mobile device 1010 via configuration of functional platform 1015, (ii) deliver content(s) or signaling in accordance with aspects described herein, or (iii) generate content(s) (e.g., images via a built-in camera) or directive(s), among other things.

Power supply 1075 can power-up device 1010 and substantially any component included thereon. It should be appreciated that alternative or additional embodiments of device 1005 may not include power supply 1075 but rather be powered via attachment to a conventional power grid.

The non-mobile device 1005 includes processor 1085 which can be communicatively and/or functionally coupled (e.g., through a memory bus) to memory 1095 in order to store and retrieve information necessary to operate and/or confer functionality, at least in part, to access component 1025, and substantially any component(s) thereon in accordance with aspects described herein; functional platform 1015; communication platform 1065 when non-mobile device 1005 includes it; and substantially any other component of non-mobile device 1005. With respect to access component 1025, and components thereon, processor 1085 can be configured to execute access protocols to convey credentials and gains access to a content management service to convey multimedia content(s) or signaling, among other things. In addition, in connection with communication platform 1065, processor 1085 can be configured to confer functionality to substantially any electronic component within communication platform 1065. Moreover, processor 1085 enables communication platform 1065 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1095 can retain multimedia content(s), in accordance with aspects of the subject innovation, or security credentials (e.g., passwords, encryption keys, digital certificates . . . ) that facilitate access to a content management service. In addition, memory 1095 can store data structures (e.g., metadata); code structure(s) (e.g., modules, objects, classes, procedures . . . ) or instructions, or substantially any type of software or firmware that processor 1085 can execute to provide functionality associated with functional platform 1015; network or device information like policies and specifications; code sequences for scrambling, spreading and pilot (e.g., reference signal(s)) transmission; amongst others.

As indicated supra, FIG. 11 presents an example embodiment of a mobile network platform 1110 that can provide a content management service for content(s) and signaling in accordance with aspects described herein. Generally, mobile network platform 1110 can include components, such as, nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In accordance with one aspect, a component within a PS domain of network platform 1110 can be employed to effect communication among sources of content(s) in accordance with aspects described herein.

With respect to CS communication, mobile network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visitation location register (VLR), which can reside in memory 1130. Moreover, CS gateway node(s) 1112 interfaces CS-based traffic and signaling and gateway node(s) 1118. As an example, in a 3GPP UMTS network, CS gateway node(s) 1112 can be embodied, at least in part, in gateway GPRS support node(s) (GGSN).

In addition to receiving and processing CS-switched traffic and signaling, PS gateway node(s) 1118 can authorize and authenticate PS-based data sessions with served mobile devices, non-mobile devices, amongst others through femto cell access points. Data sessions can include traffic, or content(s), exchange with networks external to the mobile network platform 1110, like wide area network(s) (WANs) 1150 or service network(s) 1180; it should be appreciated that local area network(s) (LANs) 1170 can also be interfaced with mobile network platform 1110 through PS gateway node(s) 1118.

Packet-switched gateway node(s) 1118 generate packet data contexts when a data session is established. To that end, in an aspect, PS gateway node(s) 1118 can include a tunnel interface (e.g., tunnel termination gateway (TTG) in 3GPP UMTS network(s) (not shown)) which can facilitate packetized communication with different wireless network(s), such as femto network platform and associated radio access network, Wi-Fi networks. It should be further appreciated that the packetized communication can include multiple flows that can be generated through service (e.g., provisioning) and application server(s) 1114. It is to be noted that in 3GPP UMTS network(s), PS gateway node(s) 1118 (e.g., GGSN) and tunnel interface (e.g., TTG) comprise a packet data gateway (PDG).

The mobile network platform 1110 also includes serving node(s) 1116 that convey various packetized flows of data streams, received through PS gateway node(s) 1118. As an example, in a 3GPP UMTS network, serving node(s) 1116 can be embodied in serving GPRS support node(s) (SGSN).

Server(s) 1114 in mobile network platform 1110 can execute numerous applications (e.g., location services, online gaming, wireless banking, wireless device management . . . ) that can generate multiple different packetized data streams or flows, and manage (e.g., schedule, queue, format . . . ) such flows. Such application(s), for example, can include add-on features to standard services provided by mobile network platform 1110. Data streams can be conveyed to PS gateway node(s) 1118 for authorization/authentication and initiation of a data session, and to serving node(s) 1116 for communication thereafter. It should be appreciated that PS gateway node(s) 1118 associated with a macro network platform can authorize, or grant access, to content management service, and PS gateway node(s) 1118 associated with a femto network platform can carry out communication with serving node(s) 1116 related to a femto network platform. Server(s) 1114 can also effect security (e.g., implement one or more firewalls) of mobile network platform 1110 to ensure network's operation and data integrity in addition to authorization and authentication procedures that CS gateway node(s) 1112 and PS gateway node(s) 1118 can enact. Moreover, server(s) 1114 can provision services from external network(s), such as WAN 1150 or Global Positioning System (GPS) network(s) (not shown). It is to be noted that server(s) 1114 can include one or more processors configured to confer at least in part the functionality of macro network platform 1110. To that end, the one or more processors can execute code instructions stored in memory 1130, for example. It is should be appreciated that server(s) 1114 can include a content manager 1115, that provides content management service. To at least that end, content manager 1115 includes issues subscription(s) to the content management service.

Memory 1130 can store information related to operation of mobile network platform 1110. Information can include content(s) received from various sources of content(s), subscriber account(s) and associated credential(s), and delivery settings(s), additional subscriber data; pricing schemes, such as promotional rates, flat-rate programs, and/or couponing campaigns, amongst others. Memory 1130 can also store information from at least one of telephony network(s) 1140, WAN 1150, LAN 1170, SS7 network 1160, or service network(s) 1180.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations comprising:
   determining first keyword data from a communication message received from a first communication device,
   determining second keyword data associated with the first keyword data, wherein the second keyword data comprises a first phrase that is selected in response to determining that the communication message is to be provided to a second communication device and a second phrase that is selected in response to determining that the communication message is to be provided to a third communication device and wherein the second keyword data is determined based on rule data that is utilized to control a granularity of the second keyword data; and
   transmitting content with the communication message, wherein the content is retrievable based on the second keyword data.

2. The system of claim 1, wherein the operations further comprise:
   based on the second keyword data, selecting search parameter data that is inserted within a query that is employable to retrieve the content.

3. The system of claim 2, wherein the content comprises link data indicative of a hyperlink to a network location relevant to the search parameter data.

4. The system of claim 2, wherein the selecting comprises selecting the search parameter data based on tone data that represents a tone associated with the text within the text message.

5. The system of claim 2, wherein the operations further comprise:
   directing, to a network-based device, the query data indicative of the query, and
   in response to the directing, receiving the content from the network-based device.

6. The system of claim 2, wherein the operations further comprise:
   employing the search parameter data to retrieve the content from a data store of the first communication device.

7. The system of claim 2, wherein the communication message comprises a text message.

8. The system of claim 1, wherein the first phrase is selected based on relationship data that represents a relationship between the first communication device and the second communication device.

9. The system of claim 1, wherein the operations further comprise:
receiving input data that configures the rule data.

10. The system of claim 1, wherein the content comprises multimedia content.

11. A method, comprising:
determining, by a system comprising a processor, a keyword of a text message that is to be transmitted via a first communication device;
based on defined rule data that controls a granularity of content search, determining, by the system, search parameter data related to the keyword, wherein the determining the search parameter data comprises determining a first parameter that is mapped to the keyword in response to determining that the text message is to be communicated to a second communication device and determining a second parameter that is mapped to the keyword in response to determining that the text message is to be communicated to a third communication device; and
transmitting, by the system, content, which has been selected based on the search parameter data, with the text message.

12. The method of claim 11, wherein the determining the search parameter data comprises determining the search parameter data based on identity data that represents an identity associated with the first communication device.

13. The method of claim 11, wherein the determining the first parameter comprises determining the first parameter based on relationship data that represents a relationship between the first communication device and the second communication device.

14. The method of claim 11, wherein the transmitting the content comprises transmitting link data indicative of a hyperlink to a network location relevant to the search parameter data.

15. The method of claim 11, wherein the transmitting the content comprises transmitting multimedia content that has been received from a data store of the first communication device.

16. The method of claim 11, wherein the transmitting the content comprises transmitting multimedia content that has been received from a network device.

17. A non-transitory machine-readable storage medium comprising executable instructions that, when executed by a processor, facilitate performance of operations, comprising:
selecting a keyword from a text message that is to be transmitted from a first communication device;
in response to determining that the text message is to be transferred to a second communication device, selecting first parameter data indicative of a first search parameter having a first level of granularity that has been mapped to the keyword, wherein the first parameter data is employable to receive first signal data representing first content that is to be transferred to the second communication device by inclusion of the first content in the text message resulting in a first modified text message to be transferred to the second communication device; and
in response to determining that the text message is to be transferred to a third communication device, selecting second parameter data indicative of a second search parameter having a second level of granularity that has been mapped to the keyword in accordance with the defined policy, wherein the second parameter data is employable to receive second signal data representing second content that is to be transferred to the third communication device by inclusion of the second content in the text message resulting in a second modified text message to be transferred to the third communication device.

18. The non-transitory machine-readable storage medium of claim 17, wherein the first parameter data is determined based on relationship data indicative of a relationship between the first communication device and the second communication device.

19. The non-transitory machine-readable storage medium of claim 17, wherein the first parameter data is determined based on identity data that is indicative of an identity associated with the first communication device.

20. The non-transitory machine-readable storage medium of claim 17, wherein the first parameter data is determined based on identity data that is indicative of an identity associated with the second communication device.

* * * * *